United States Patent
Byers et al.

(10) Patent No.: US 6,678,594 B2
(45) Date of Patent: Jan. 13, 2004

(54) USER-CONFIGURABLE STEERING CONTROL FOR STEER-BY-WIRE SYSTEMS

(75) Inventors: Michael D. Byers, Ypsilanti, MI (US); Brian Thomas Murray, Novi, MI (US); Sanket Suresh Amberkar, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/775,880

(22) Filed: Feb. 2, 2001

(65) Prior Publication Data

US 2002/0107621 A1 Aug. 8, 2002

(51) Int. Cl.$^7$ .............................. B62D 5/04; B62D 5/00; B62D 11/00
(52) U.S. Cl. ........................... 701/41; 701/42; 180/422; 388/930
(58) Field of Search .............................. 701/41, 42, 43; 180/422, 443, 446, 402; 388/907.5, 930

(56) References Cited

U.S. PATENT DOCUMENTS

| | | | |
|---|---|---|---|
| 4,800,974 A | * 1/1989 | Wand et al. ................. 180/79.1 |
| 4,860,844 A | 8/1989 | O'Neil ........................ 180/79.1 |
| 5,228,757 A | 7/1993 | Ito et al. ........................ 303/100 |
| 5,251,135 A | 10/1993 | Serizawa et al. ......... 364/424.05 |
| 5,257,828 A | * 11/1993 | Miller et al. ................. 180/79.1 |
| 5,347,458 A | * 9/1994 | Serizawa et al. ......... 364/424.05 |
| 5,374,877 A | 12/1994 | Imaseki et al. ................. 318/34 |
| 5,475,289 A | * 12/1995 | McLaughlin et al. ........ 318/432 |
| 5,576,957 A | 11/1996 | Asanuma et al. ......... 364/424.05 |
| 5,653,304 A | 8/1997 | Renfroe ....................... 180/402 |
| 5,668,722 A | * 9/1997 | Kaufmann et al. ............. 701/41 |
| 5,740,040 A | 4/1998 | Kifuku et al. ......... 364/424.05 |
| 5,828,972 A | 10/1998 | Asanuma et al. ............. 701/41 |
| 5,829,547 A | 11/1998 | Fujii et al. ................... 180/422 |
| 5,925,083 A | 7/1999 | Ackermann ................... 701/41 |
| 6,018,691 A | 1/2000 | Yamamoto et al. ............ 701/41 |
| 6,097,286 A | 8/2000 | Discenzo .................... 340/465 |
| 6,098,296 A | 8/2000 | Perisho, Jr. et al. .......... 33/203 |

(List continued on next page.)

FOREIGN PATENT DOCUMENTS

| | | | | |
|---|---|---|---|---|
| EP | 0278366 B1 | 2/1988 | ............ | B62D/6/00 |
| EP | 0858408 B1 | 10/1996 | ............ | B62D/5/06 |
| EP | 0985591 A2 | 8/1999 | | |
| GB | 2341588 A | 2/2000 | ............ | B62D/5/32 |
| JP | 60259570 | 12/1985 | ............ | B62D/7/14 |
| JP | 1115778 | 5/1989 | | |
| JP | 8034353 | 2/1996 | ............ | B62D/1/12 |
| WO | 00/34106 | 6/2000 | ............ | B62D/1/06 |

OTHER PUBLICATIONS

J.Y. Wong, Ph.D., "Chapter Five: Handling Characteristics of Road Vehicles," *Theory of Ground Vehicles*, 1978, pp. 210–214. (Month is not available).

*Primary Examiner*—Tan Nguyen
*Assistant Examiner*—Dalena Tran
(74) *Attorney, Agent, or Firm*—Michael D. Smith

(57) ABSTRACT

A steer-by-wire control system comprising a master control system, a road wheel system, and a hand wheel system is disclosed. The road wheel system is connected to the master control system and includes a road wheel position sensor and a rack force sensor. The hand wheel system is connected to the master control system and the road wheel system and includes a hand wheel position sensor and a torque sensor. The steer-by-wire system also includes a vehicle speed sensor for producing a vehicle speed signal. In addition a hand wheel actuator configured to receive commands from the hand wheel system and a road wheel actuator configured to receive commands from the road wheel system are utilized. The hand wheel system and road wheel system each include a configurable control topology.

92 Claims, 9 Drawing Sheets

U.S. PATENT DOCUMENTS

| | | | |
|---|---|---|---|
| 6,102,151 A | 8/2000 | Shimizu et al. | 180/446 |
| 6,152,254 A | 11/2000 | Phillips | 180/422 |
| 6,176,341 B1 * | 1/2001 | Ansari | 180/402 |
| 6,179,394 B1 | 1/2001 | Browalski et al. | 303/146 |
| 6,208,923 B1 | 3/2001 | Hommel | 701/42 |
| 6,219,604 B1 * | 4/2001 | Dilger et al. | 701/41 |
| 6,244,372 B1 * | 6/2001 | Sakamaki et al. | 180/422 |
| 6,279,674 B1 | 8/2001 | Lissel et al. | 180/402 |
| 6,279,675 B1 | 8/2001 | Bohner et al. | 180/403 |
| 6,283,243 B1 | 9/2001 | Bohner et al. | 180/406 |
| 6,285,936 B1 * | 9/2001 | Bohner et al. | 701/41 |
| 6,285,963 B1 | 9/2001 | Bohner et al. | 701/41 |

* cited by examiner

USER-CONFIGURABLE STEERING CONTROL FOR STEER-BY-WIRE SYSTEMS

BACKGROUND

Steering equipment for assisting a driver to steer an automobile is well known in the art. In conventional steering assemblies, the operator controls the direction of the vehicle with the aid of a steering wheel. This wheel is mechanically connected, usually through a gear assembly to the roadwheels. To aid the operator, many systems utilize an auxiliary system to generate a force that is transmitted to a steering gear assembly. The additional force reduces the effort required by the operator in changing the direction of the vehicle. Typically, this auxiliary force is generated by either a hydraulic drive or an electric motor. Because the steering wheel is connected directly to the roadwheels, the resulting mechanical assembly that provides the connection can be quite complicated and expensive to produce. One advantage in having a direct connection is that the operator receives tactile feedback through the steering wheel. For example, if the vehicle changes directions while it is moving, the operator will feel resistance in the steering wheel.

For Steer-by-wire control systems, tactile feedback may be provided to the operator by generating feedback forces in a hand wheel system that includes an actuator. Two methods have been considered for converting the sensed road forces back to the driver. The first method is direct, and simply commands the sensed forces to the Hand Wheel actuator to provide the road resistance to the driver. The advantage of this method is that the driver (almost) instantaneously feels the road forces. But, the resulting steering feel to the driver will also be sensitive to changes in the system or component variations. The second method also utilizes a road force sensor, but in a feedback loop with a torque sensor signal to generate an error signal. The advantage of this method is its insensitivity to variations (and or disturbances) in the hand wheel system. Unfortunately, to ensure adequate tactile feedback of road forces, the loop gain generally needs to be quite high, thereby making the system potentially prone to instability or susceptible to noise. Moreover, the desired road feel to the operator is commonly very subjective and a function of individual vehicle characteristics and operator taste.

Therefore, is it considered advantageous to provide a steering control system that provides customizable tactile feedback to the operator allowing for user configurable handling and response characteristics, while maintaining a system that is less sensitive to induced disturbances, but avoids instability and noise susceptibility.

BRIEF SUMMARY OF THE INVENTION

A steer-by-wire control system comprising a master control system, a road wheel system, and a hand wheel system is disclosed. The road wheel system is connected to the master control system and includes a road wheel position sensor to produce and transmit a road wheel position and a rack force sensor to produce and transmit a rack force signal. The hand wheel system is connected to the master control system and the road wheel system and includes a hand wheel position sensor to produce and transmit a hand wheel position signal and a torque sensor to produce and transmit a hand wheel torque signal. The steer-by-wire system also includes a vehicle speed sensor for producing a vehicle speed signal, where the vehicle speed sensor is connected to at least one of the master control system, the hand wheel system, and road wheel system. In addition a hand wheel actuator configured to receive commands from the hand wheel system and a road wheel actuator configured to receive commands from the road wheel system are utilized. The hand wheel system and road wheel system each include a configurable control topology.

DETAILED DESCRIPTION OF THE INVENTION

Figure 1A:
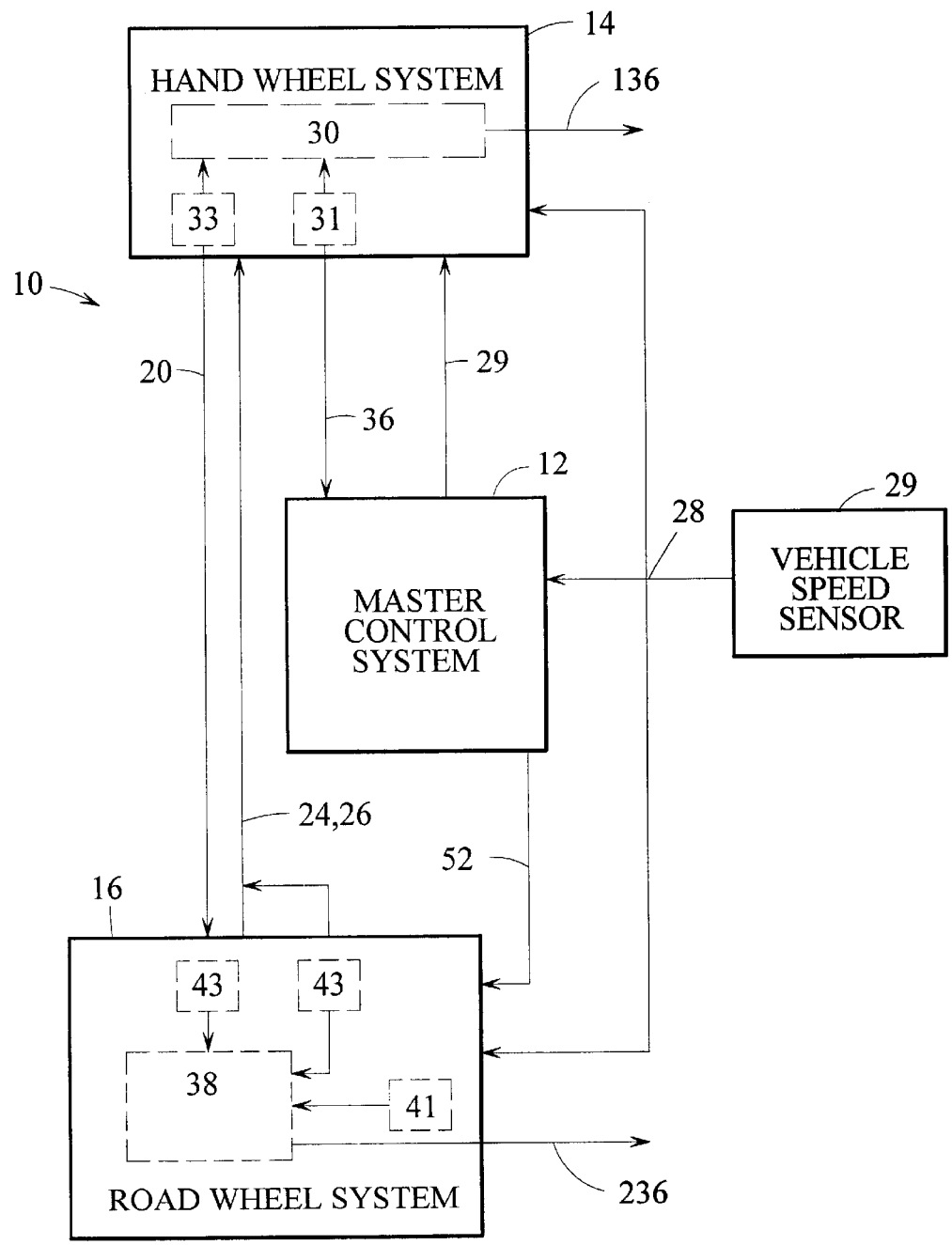
FIG. 1a is a block diagram of the steer by wire system.
Figure 1B:
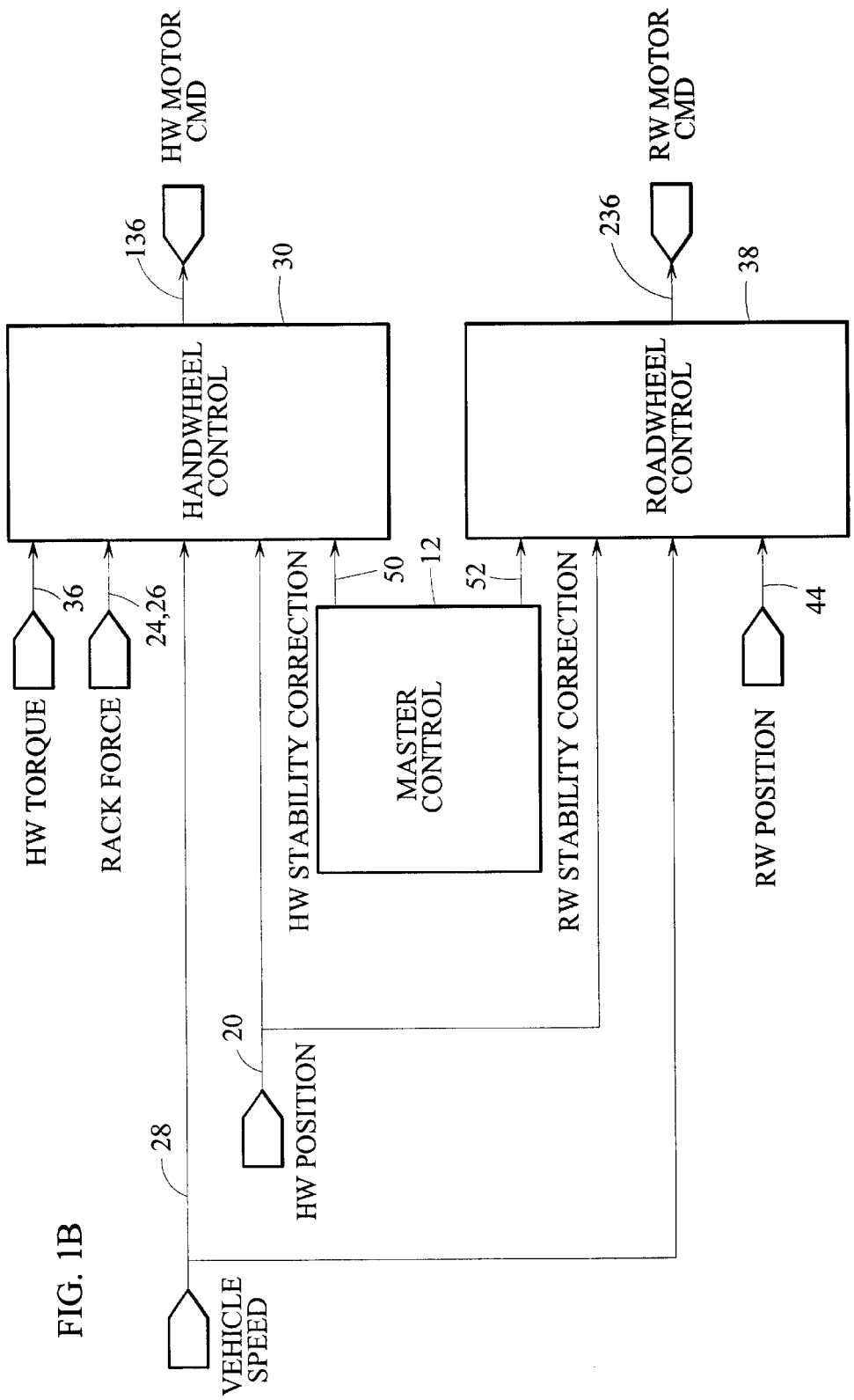
FIG. 1b is a block diagram illustrating the user configurable steering actuator control algorithm for a steer-by-wire control system.

Referring to FIGS. 1a and 1b, a steering control system is depicted. The steer-by-wire control system 10 comprises several closed loop subsystems that work in conjunction to provide an operator with control over the vehicle direction while providing appropriate tactile feedback to the operator.

The disclosed embodiments may be utilized in various types of vehicles employing electronic steering or steer by wire systems. A preferred embodiment, by way of illustration is described herein as it may be applied to an automobile employing a steer by wire system. While a preferred embodiment is shown and described by illustration and reference to an automobile steering system, it will be appreciated by those skilled in the art that the invention is not limited to the automobiles alone by may be applied to other vehicles employing electronic steering systems or steer by wire systems.

The hand wheel system 14 is a closed loop control system that uses hand wheel torque signal 36 as the feedback to control a hand wheel actuator (not shown). The hand wheel system 14 detects the position and movement of a hand wheel (not shown) as made by an operator with a hand wheel position sensor 33 and sends a hand wheel position signal 20 to both the hand wheel system 14 and road wheel system 16. The hand wheel position sensor 33 may sense the position based on optical detection, magnetic field variations, or other methodologies. Typical position sensors include potentiometers, resolvers, synchros, encoders, and the like, as well as combinations comprising at least one of the forgoing.

Figure 3:
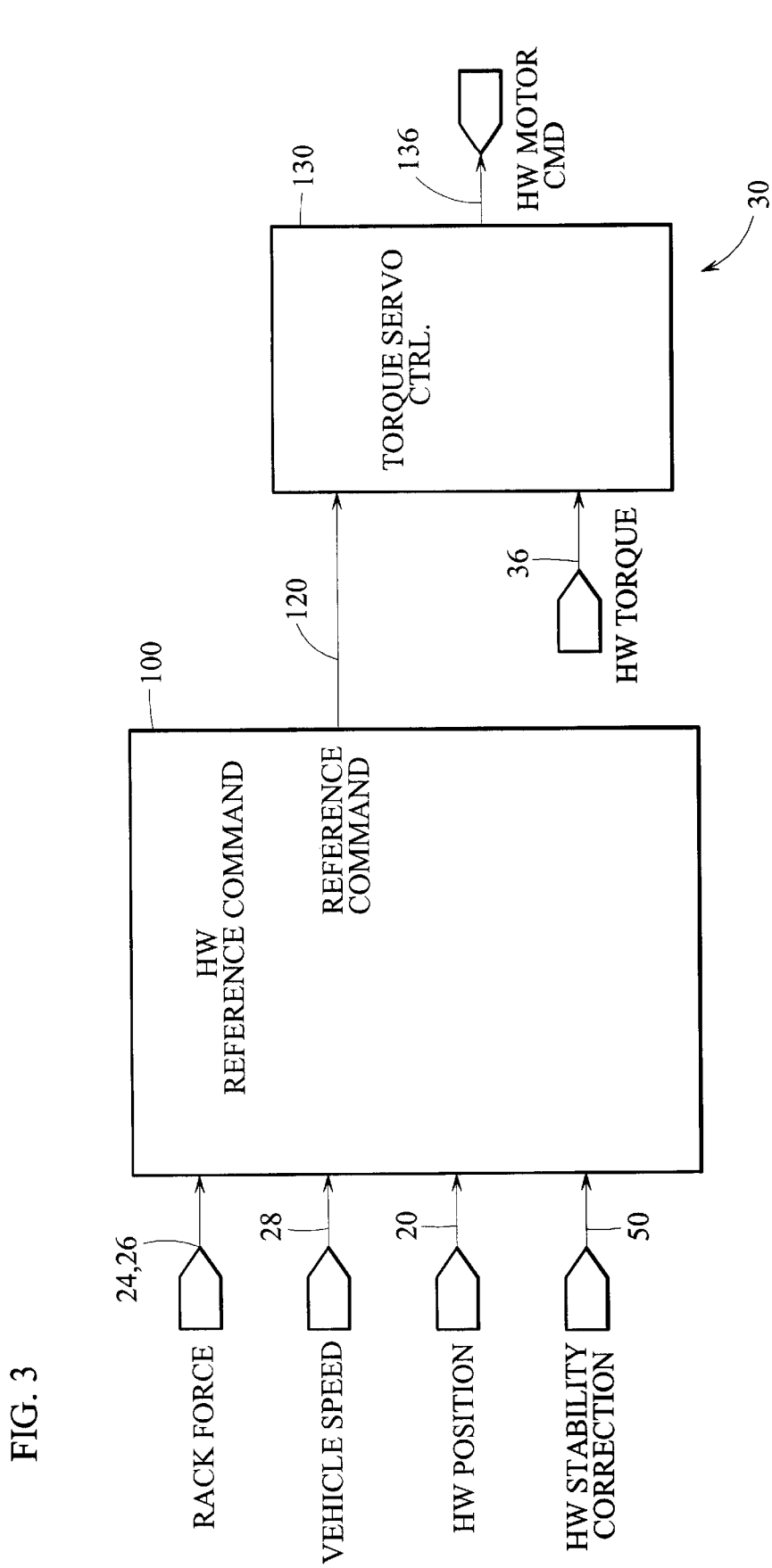
FIG. 3 is a block diagram of the hand wheel control system.

The hand wheel system 14 utilizes the rack force signals 24 and 26 to generates an equivalent hand wheel torque value 113. The equivalent hand wheel torque value 113 is compensated for vehicle speed and summed with a speed compensated, position feedback signal 118 and a hand wheel stability correction 50 to generate a hand wheel reference command signal 120. A servo control loop is utilized to track the hand wheel reference command signal 120 and maintain the stability of the hand wheel system 14. A hand wheel actuator (not shown) responsive to a hand wheel actuator command signal 136 contains the necessary elements to provide a reaction torque to the operator as well as a torque sensor 31 to provide the measured hand wheel torque signal 36 for the torque feedback loop in the servo control 130 (FIG. 3). Generally, reaction torque will be imparted to the operator by a hand wheel actuator (e.g., an electric motor) coupled either to the steering column or the rack of the vehicle (not shown) and commanded by the torque servo control 130 (FIG. 3).

Each of the major systems as described may also include additional functions and capabilities not directly relevant to this disclosure, which need not be described herein. Further, as used herein, signal connections and interfaces may physically take any form capable of transferring a signal or data, including electrical, optical, or radio, whether digital, modulated, or not and the like, as well as combinations thereof and may include and employ various technologies in implementation, such as wired, wireless, fiber optic, and the like, including combinations thereof. It will also be appreciated that look up tables and any filters may take the form of or include multipliers, modulators, schedulers or gains, scaling, and the like, which are configured to be dynamic and may also be the function of other parameters.

In an embodiment, a system and method for user configurable steering control algorithms in a steer-by-wire system 10 is disclosed. FIG. 3 depicts the hand wheel control system 30 of the hand wheel system 14. The hand wheel control system 30 is comprised of two sub-systems: the hand wheel reference command unit 100 and the torque servo control unit 130. The hand wheel reference command unit 100 includes a configurable control topology, which includes as inputs rack force signal(s) or their equivalent 24 and 26, as measured by rack force sensor(s) 43 the vehicle speed signal 28, the hand wheel position signal 20 as sensed by hand wheel position sensor 33, and a hand wheel stability correction 50 as calculated by the master control system 12. The hand wheel reference command unit 100 provides as an output a hand wheel reference command signal 120, which identifies the desired torque reference for the torque servo control unit 130. The torque servo control unit 130 includes as inputs the hand wheel reference command signal 120, and the hand wheel torque signal 36 as sensed by torque sensor 31.

Figure 2:
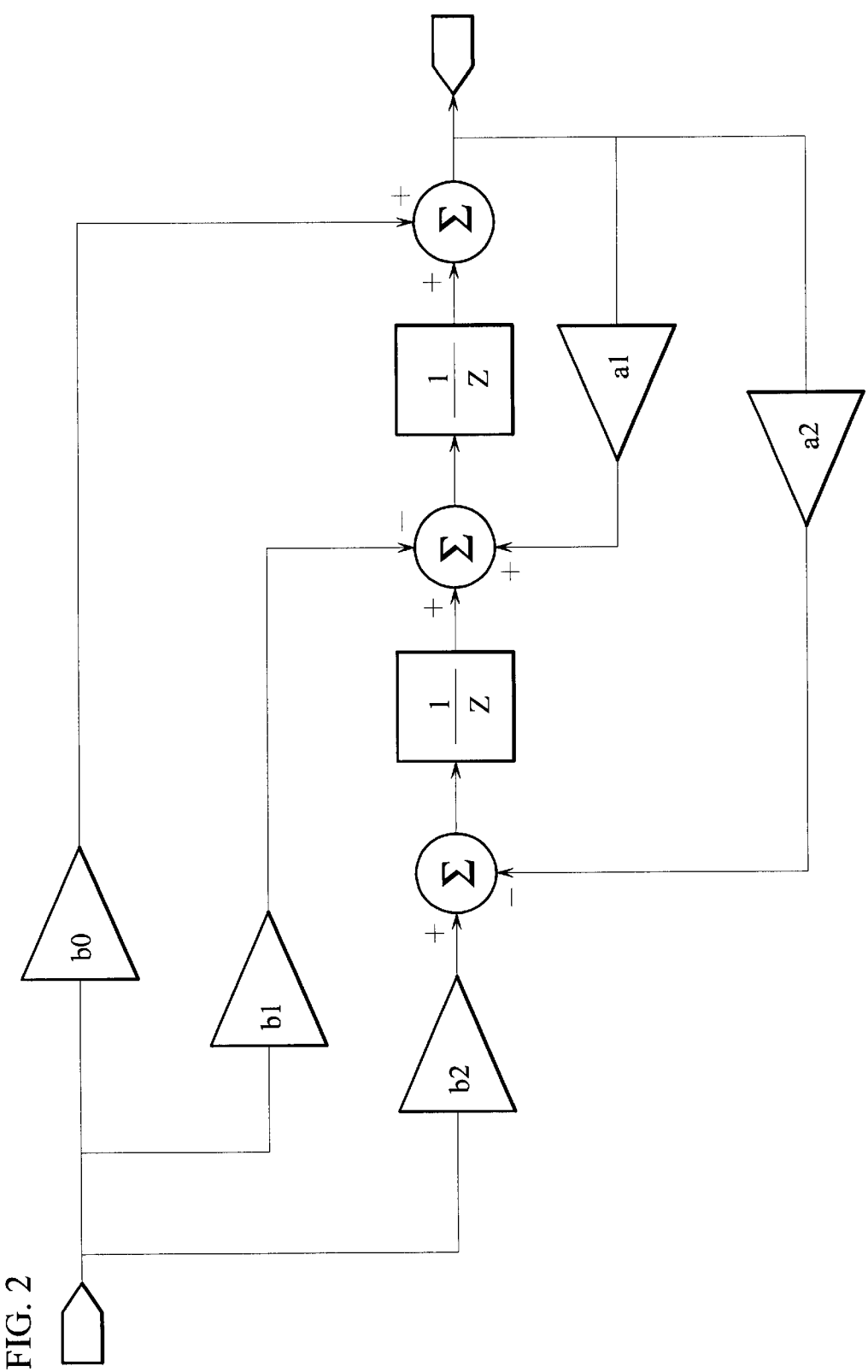
FIG. 2 is a block diagram of a standard second order digital filter implementation.
Figure 4:
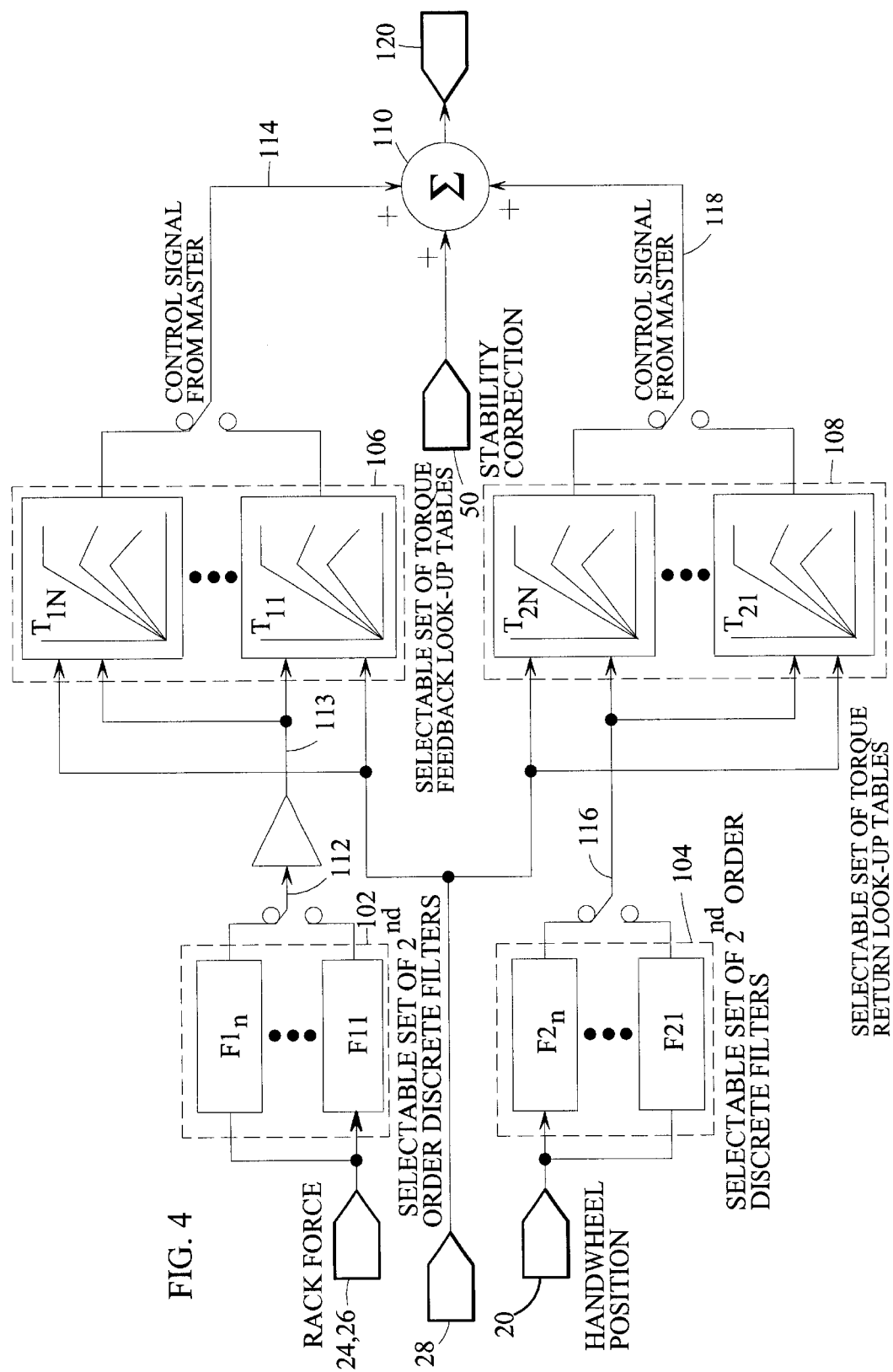
FIG. 4 depicts the process for generating the hand wheel reference command.

Referring to FIG. 4, the details of the configurable control topology of the hand wheel reference command unit 100 are depicted. The rack force signals 24 and 26, are passed through a one or more configurable, frequency based filter(s) 102, which provide the desired frequency characteristics in the resultant force signal 112. In an embodiment, a typical filter, for example, as depicted in FIG. 2 may be employed, where the coefficients of the filter are selected to achieve the desired filtering characteristics. A second order filter has been selected because its topology provides the broadest variety of filtering characteristics and yet includes sufficient dynamic capability to capture the desired range of system characteristics. It will be appreciated that a variety of filter designs, topologies and systems may be employed to achieve the prescribed filtering characteristics. User configurability provides the flexibility to modify the spectral content of the rack force signals 24, 26. In turn, this allows modification in the frequency range (bandwidth) of the road feedback provided to the driver. This feature enables the vehicle original equipment manufacturer (OEM) to tailor and customize the characteristics of the steer-by-system 10 to a variety of vehicle types. For example, an OEM may elect to provide a wide frequency range of response for a very dynamic vehicle, such as a sports car, while at the same time choose to employ a narrower response range for a touring sedan. The configurability however, should be limited and interlocked with respect to the dynamics that can be modified by the OEM to avoid choices that would affect the stability of the steer by wire system 10. In a broader sense, this concept may be implemented as a set of configurable filter(s) 102 with coefficients selected for modifying the tactile feedback to the operator under different driving conditions. For example, while it is desirable to reduce the road feedback during normal highway driving, it would also be desirable to increase the road feedback under aggressive driving conditions. Once again, a typical filter, for example, as depicted in FIG. 2 may be employed, where the coefficients of the filter are selected to achieve the desired filter characteristics. The master control system 12 may then select the appropriate filter. In addition, a selection means may be implemented to allow an operator to choose between various preset filters.

The resultant force signal 112 is then scaled as may be required to an equivalent hand wheel torque value 113. This scaling is a function of the desired steering ratio and may vary over vehicle applications. The equivalent hand wheel torque value 113 is then applied, along with the vehicle speed signal 28 to one or more configurable, torque feed back look-up table(s) 106 to generate a speed compensated, force feedback signal 114. Once again, user configurability provides the flexibility to modify the steering effort as a function of the vehicle speed. This in turn, provides access to implement customized tuning. This feature once again, enables an OEM to tailor and customize the characteristics of the steer-by-wire system 10 to a variety of vehicle characteristics and types. For example, an OEM may elect to utilize proprietary tailoring to yield a vehicle exhibiting characteristics for which that OEM is highly renown. In a broader sense, the embodiment maybe considered and implemented as a set of configurable lookup tables 106 with tuning chosen to modify the effort based on driver preference. For example, a driver could select between the default steering effort level and sportier feel characteristics. A driver selection switch may be implemented to allow the driver to select among the preset tables.

Referring once again to FIG. 4, a second function performed as part of the sub-system hand wheel reference command unit 100 is the calculations based upon hand wheel position. In a manner similar to the abovementioned embodiment, the hand wheel position signal 20 is also passed through one or more configurable, frequency based filter(s) 104 (for example, as depicted in FIG. 2), which provides the desired frequency characteristics in the resultant position signal 116. Once again, user configurability provides OEM the flexibility to modify the spectral content of the position signal. In this instance, this allows the return forces provided to the driver to be modified and characterized as a function of both the hand wheel position and its transient dynamics. In a broader sense, this embodiment may be considered and implemented as a set of configurable filters with the filter coefficients chosen for modifying the return force dynamic characteristics. Similar to the previously mentioned embodiments, the appropriate filter may then be selected by the master control system 12. Likewise, a driver selection switch capability may be implemented to allow operators to select among the preset filters.

This resultant position signal 116 is then applied, along with the vehicle speed signal 28 to a configurable, torque return look-up table 108 to generate a speed compensated, position feedback signal 118. Finally, user configurability provides the flexibility to modify the steering return force characteristics as a function of the vehicle speed. This in turn provides access to implement customized tuning. Similarly, this feature enables an OEM to tailor and customize the characteristics of the steer-by-system 10 to a variety of vehicle characteristics and types. For example, an OEM may elect to utilize proprietary tailoring to yield a vehicle exhibiting characteristics for which that OEM is highly renown. In yet another sense, this may be embodied as a set of configurable lookup tables with tuning chosen to modify the return torque based on driver preference. For example, again, a driver could select between the default steering return and sportier feel characteristics. As stated earlier, a driver selection switch may be implemented to allow an operator to select among the preset tables. The position feedback signal 118 along with the force feedback signal 114 are summed with the hand wheel stability correction 50 at summer 110 to generate the hand wheel reference command signal 120.

Figure 5:
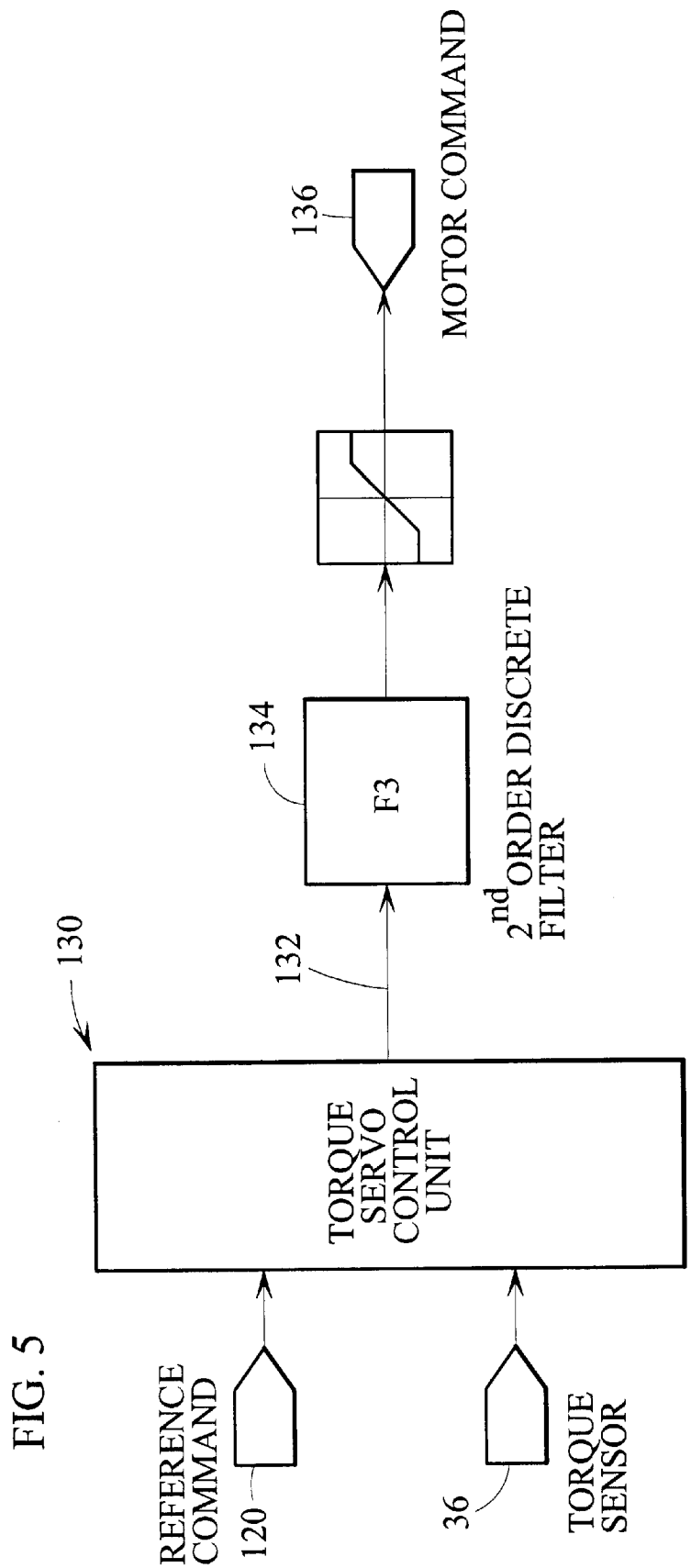
FIG. 5 depicts the hand wheel torque servo loop.

Referring to FIG. 5, the hand wheel torque servo control unit 130 processing is depicted, where the hand wheel reference command signal 120 is compared with the measured hand wheel torque signal 36, thereby generating a hand wheel torque error signal 132. This hand wheel torque error signal 132 is then compensated in a predetermined frequency based compensator 134 to formulate a hand wheel motor command signal, which is applied as a command to the hand wheel actuator. This compensation is designed to provide the required stability and performance of the sub-system and is not user configurable.

Figure 6:
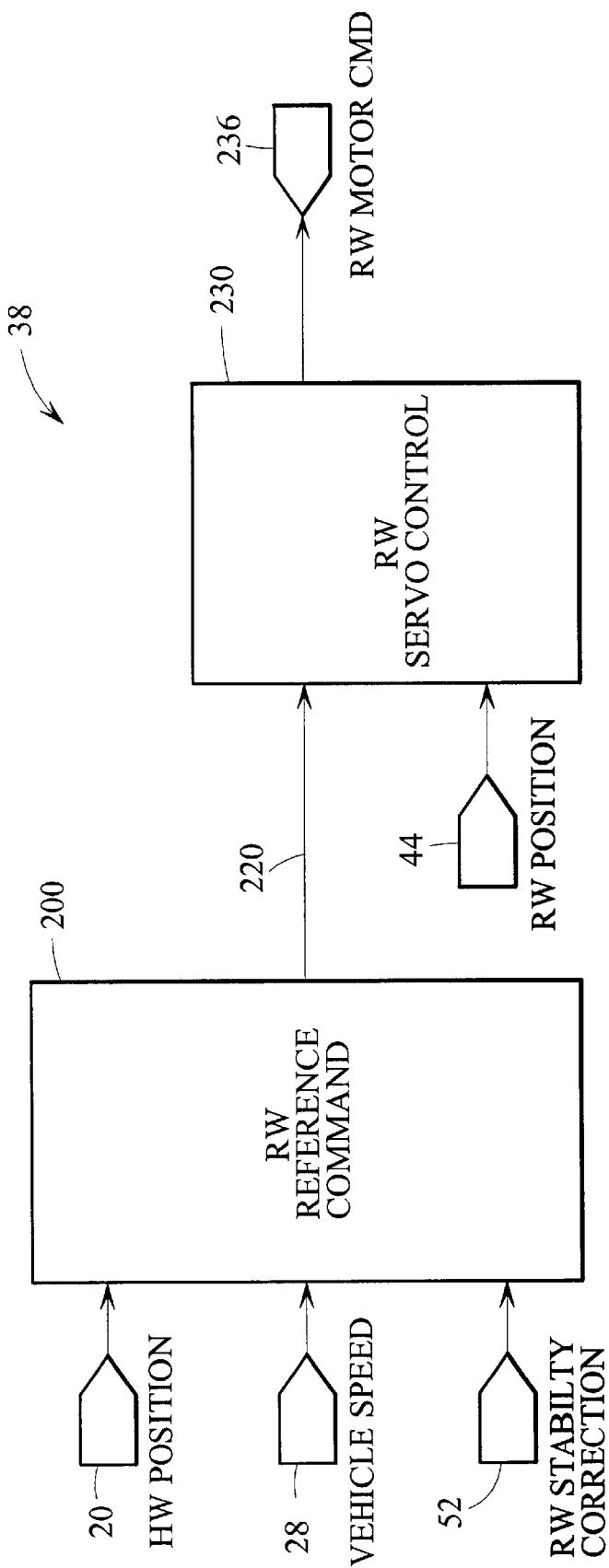
FIG. 6 is a block diagram of the road wheel control system.

The road wheel system 16, as depicted in FIG. 6, is also a closed loop control system that uses a road wheel position signal 44 from a road wheel position sensor 41 as a feedback signal in a closed loop control system command the position of the road wheels of a vehicle. The road wheel position sensor 41 may sense the position based on optical detection, magnetic field variations, or other methodologies. Typical position sensors include potentiometers, resolvers, synchros, encoders, and the like, as well as combinations comprising at least one of the forgoing. Typically, a separate road wheel system 16 is utilized for each steerable wheel. However, for simplicity, a single road wheel system 16 is depicted in the figure. A rack force or equivalent sensor 43 is also located within road wheel system 16. The rack force signal is then sent to the hand wheel system 12. The rack force sensor 43 may sense the forces based on optical detection, magnetic field variations, or other methodologies. Typical force sensors include torque bars, strain gauges, deflecting members, potentiometers, resolvers, synchros, encoders, and the like, as well as combinations comprising at least one of the forgoing.

The road wheel control system 38 of the road wheel system 16 is comprised of two sub-systems: the road wheel reference command unit 200 and the road wheel servo control unit 230. The road wheel reference command unit 200 includes a configurable control topology, which includes as inputs the vehicle speed signal 28, the hand wheel position 20 as sensed by hand wheel position sensor 33 of the hand wheel system 14, and a road wheel stability correction 52 as calculated by the master control system 12. The road wheel reference command unit 200 provides as an output a road wheel reference command signal 220, which identifies the position reference for the road wheel servo control unit 230. The road wheel servo control unit 230 includes as inputs the road wheel reference command signal 220, and a road wheel position signal 44 as sensed by road wheel position sensor 41.

Figure 7:
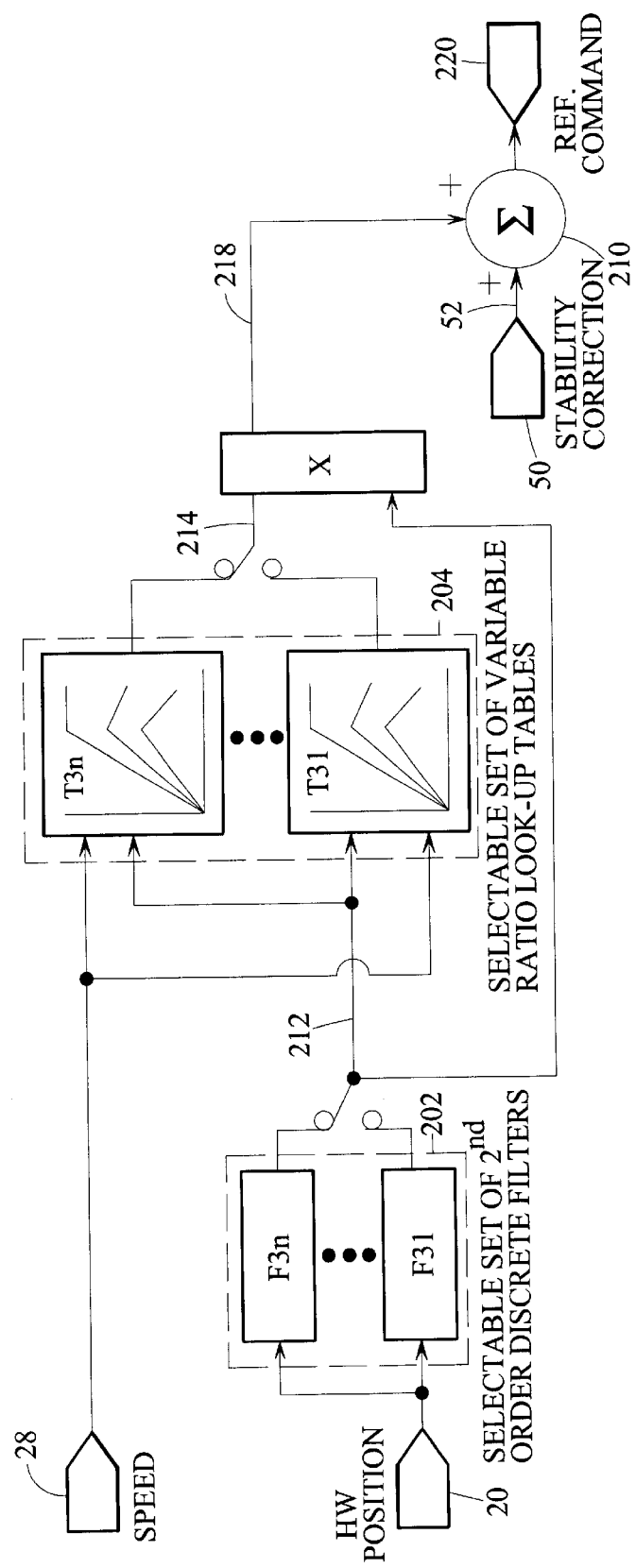
FIG. 7 is a block diagram depicting the process for generating the road wheel reference command.

Referring to FIG. 7, similar to the hand wheel control system 30 the road wheel control system 38 employs configurable filters and look up tables to affect the road wheel control. In an embodiment, a typical filter, for example, as depicted in FIG. 2 may be employed, where the coefficients of the filter are selected to achieve the desired filtering characteristics. A second order filter has been selected because its topology provides the broadest variety of filtering characteristics and yet includes sufficient dynamic capability to capture the desired range of system characteristics. It will be appreciated that a variety of filter designs, topologies and systems may be employed to achieve the prescribed filtering characteristics. The hand wheel position signal 20 is passed through one or more configurable, frequency based filter(s) 202, which provides the desired frequency characteristics in the resultant hand wheel position signal 212. The user configurability is to provide the flexibility to modify the spectral content of the position signal 20. This in turn, may be used to control the slew rate and filter the high frequency dynamics of the position signal 20. This feature enables the vehicle OEM to tailor and customize the characteristics of the steer-by-system 10 to a variety of vehicle types. For example, an OEM may elect to limit the dynamic slew rate of the hand wheel position signal 20 to limit road wheel system 16 response to high rate inputs and avoid undesirable or unachievable road wheel commands. It is once again, however, noteworthy to appreciate that the configuration should be limited with respect to the dynamics that can be modified by the OEM to avoid choices that would affect the stability of the steer by wire system 10. In a broader sense, this concept may be implemented as a set of configurable filters with coefficients selected for modifying the dynamics. The master control system 12 could then select the appropriate filter. In addition, a driver selection means may be implemented to allow an operator to choose among the preset filters.

The resultant hand wheel position signal 212 is then applied, along with the vehicle speed signal 28 to a configurable, variable ratio look-up table 204 to generate a speed compensated steering ratio 214. The steering ratio represents the ratio of road wheel position to hand wheel position. It is noteworthy to appreciate, that the variable ratio look-up table 204 allows for variation of the system "gain" as a function of vehicle speed. Thereby, the steer-by-wire system 10 may be dynamically modified to address a variety of driving conditions. Here again, user configurability provides the flexibility to modify the overall steering ratio as a function of the vehicle speed signal 28. This in turn provides the opportunity to implement customized tuning. This feature enables the vehicle OEM to tailor and customize the characteristics of the steer-by-system 10 to a variety of vehicle types. For example, an OEM may elect to provide an OEM proprietary steering ratio. Such customization may be embodied and implemented as a set of configurable lookup tables with tuning selected to modify the steering ratio based on driving conditions. For example, it may be desirable to increase the steering ratio under aggressive driving conditions. Similarly, it may be desirable to modify the steering ratio to improve high-speed driving characteristics as opposed to those for low speed or parking conditions. The master control system 12 may include a selection for the appropriate table. In addition a driver selection switch may be utilized to allow an operator to select between the preset tables.

The resultant hand wheel position signal 212 and the speed compensated steering ratio 214 are multiplied at multiplier 206 to generate road wheel reference position signal 218. The road wheel reference position signal 218 is summed at summer 210 with a road wheel stability correction 52 to generate the road wheel reference command signal 220.

Figure 8:
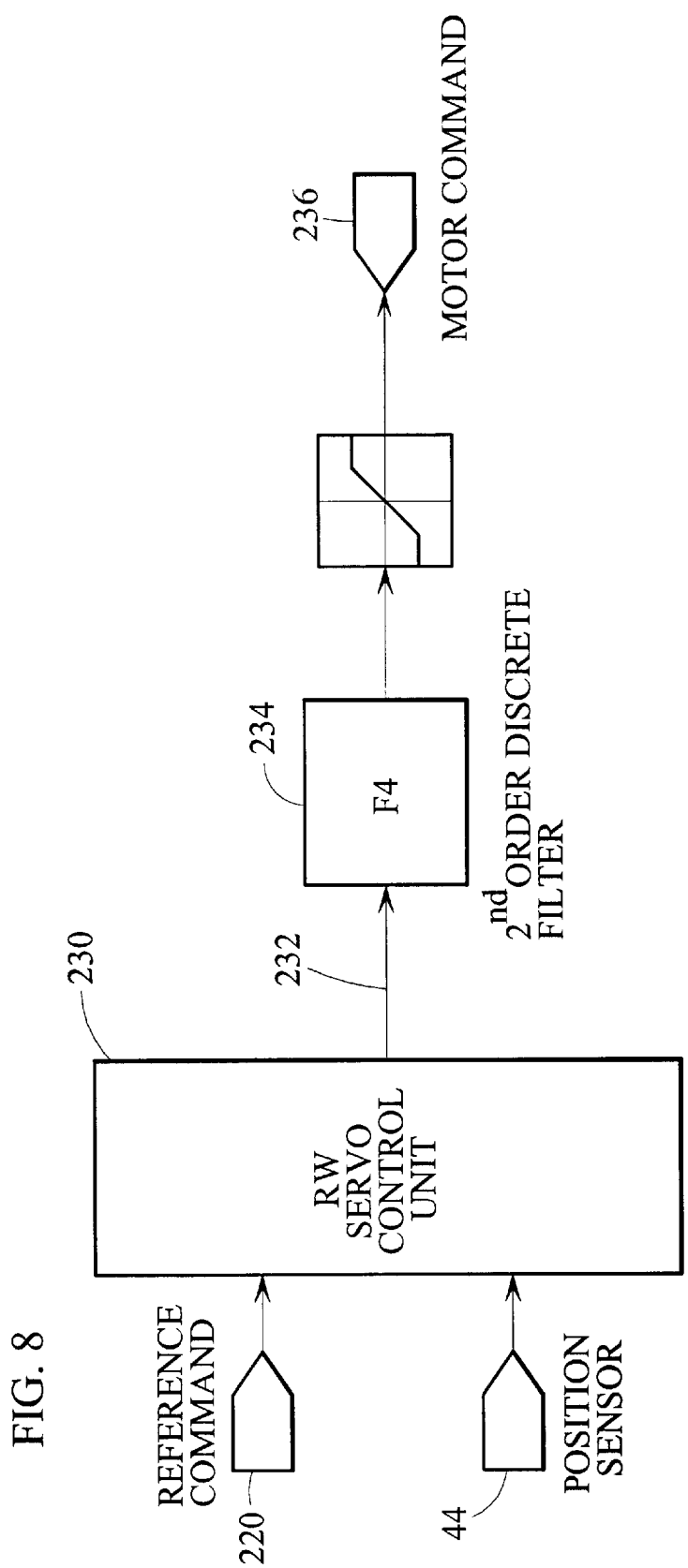
FIG. 8 is a block diagram depicting the road wheel servo control loop.

Referring to FIG. 8, the road wheel servo control unit 230 where the road wheel reference command signal 220 is compared with the road wheel position signal 44, thereby generating a position error signal 232. This position error signal 232 is then compensated in a predetermined frequency based compensator 234 to formulate a road wheel actuator command signal 236 and applied as a command to the road wheel actuator. This compensation is designed to provide the required stability and performance of the road wheel control system 38 and is not configurable.

It is important to note that all the examples provided herein relate to a vehicle having two steerable wheels. However, this type of system could be easily extended to a vehicle that requires all four wheels to be steered simultaneously by adding a second roadwheel system 16.

The disclosed invention may be embodied in the form of computer or processor-implemented processes and apparatuses for practicing those processes. The present invention can also be embodied in the form of computer or processor program code containing instructions embodied in tangible media, such as floppy diskettes, CD-ROMs, hard drives, or any other computer-readable storage medium, wherein, when the program code is loaded into and executed by a computer or processor, the computer becomes an apparatus for practicing the invention. The present invention can also be embodied in the form of program code, for example, whether stored in a storage medium, loaded into and/or executed by a computer or processor, or as data signal transmitted whether a modulated carrier wave or not, over some transmission medium, such as over electrical wiring or cabling, through fiber optics, or via electromagnetic radiation, wherein, when the program code is loaded into and executed by a computer or processor, the computer or processor becomes an apparatus for practicing the invention. When implemented on a general-purpose microprocessor, the program code segments may configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A steer-by-wire control system, comprising:
    a master control system;
    a road wheel system electrically connected to said master control system including a road wheel position sensor to produce and transmit a road wheel position and a rack force sensor to produce and transmit a rack force signal;
    a hand wheel system electrically connected to said master control system and said road wheel system including a hand wheel position sensor to produce and transmit a hand wheel position signal and a torque sensor to produce and transmit a hand wheel torque signal;
    a vehicle speed sensor for producing a vehicle speed signal, said vehicle speed sensor electrically connected to at least one of; said master control system, said hand wheel system, and said road wheel system;
    a hand wheel actuator configured to receive commands from said hand wheel system;
    a road wheel actuator configured to receive commands from said road wheel system;
    wherein said hand wheel system includes a configurable control topology; and
    wherein said road wheel system includes a configurable control topology.

2. The steer-by-wire control system of claim 1 wherein said master control system calculates a hand wheel stability correction and a road wheel stability correction.

3. The steer-by-wire control system of claim 2 wherein said hand wheel system comprises a closed loop control system responsive to at least one of said hand wheel torque signal, said rack force signal, said vehicle speed signal, said hand wheel position signal and said hand wheel stability correction.

4. The steer-by-wire control system of claim 2 wherein said hand wheel system comprises a hand wheel reference command unit and a torque servo control unit.

5. The steer-by-wire control system of claim 4 wherein:
    said hand wheel reference command unit is responsive to said rack force signal, said vehicle speed signal, said hand wheel position signal and said hand wheel stability correction and generates a hand wheel reference command signal; and said torque servo control unit is responsive to said hand wheel torque signal and said hand wheel reference command signal to provide a command to said hand wheel actuator wherein said hand wheel actuator is configured to position a hand wheel thereby generating a reaction torque.

6. The steer-by-wire control system of claim 5 wherein said torque servo control unit includes a frequency based compensator configured to characterize spectral content of at least one of said hand wheel reference command signal and said hand wheel torque signal to maintain stability of said hand wheel system.

7. The steer-by-wire control system of claim 5 wherein said hand wheel system includes a configurable frequency based filter configured to characterize spectral content of said rack force signal to increase bandwidth of said hand wheel system.

8. The steer-by-wire control system of claim 7 wherein said configurable frequency based filter comprises a user configurable filter.

9. The steer-by-wire control system of claim 7 wherein said configurable frequency based filter comprises a second order discrete filter.

10. The steer-by-wire control system of claim 5 wherein said hand wheel system includes a configurable frequency based filter configured to characterize spectral content of said hand wheel position to control return force dynamic characteristics of said hand wheel system.

11. The steer-by-wire control system of claim 10 wherein said configurable frequency based filter comprises a user configurable filter.

12. The steer-by-wire control system of claim 10 wherein said configurable frequency based filter comprises a second order discrete filter.

13. The steer-by-wire control system of claim 10 wherein said hand wheel system includes another configurable frequency based filter configured to characterize spectral content of said rack force signal to increase bandwidth of said hand wheel system.

14. The steer-by-wire control system of claim 13 wherein said another configurable frequency based filter comprises a user configurable filter.

15. The steer-by-wire control system of claim 13 wherein said another configurable frequency based filter comprises a second order discrete filter.

16. The steer-by-wire control system of claim 13 wherein said hand wheel reference command signal results from a summation including a hand wheel stability correction, a force feedback signal, and a position feed back signal.

17. The steer-by-wire control system of claim 16 wherein said force feedback signal results from a torque feed back look up table responsive to said vehicle speed signal and a resultant force signal.

18. The steer-by-wire control system of claim 16 wherein said force feedback signal results from a torque feed back look up table responsive to said vehicle speed signal and a resultant force signal.

19. The steer-by-wire control system of claim 18 wherein said torque feed back look up table is user configurable.

20. The steer-by-wire control system of claim 18 wherein said resultant force signal comprises a resultant from a configurable frequency based filter responsive to said rack force signal.

21. The steer-by-wire control system of claim 20 wherein said configurable frequency based filter is user configurable.

22. The steer-by-wire control system of claim 18 wherein said position feed back signal results from a torque return look up table responsive to said vehicle speed signal and a resultant position signal.

23. The steer-by-wire control system of claim 22 wherein said torque return look up table is user configurable.

24. The steer-by-wire control system of claim 22 wherein said resultant position signal results from another configurable frequency based filter responsive to said hand wheel position signal.

25. The steer-by-wire control system of claim 22 wherein said another configurable frequency based filter is user configurable.

26. The steer-by-wire control system of claim 5 wherein said hand wheel reference command signal results from a summation including a hand wheel stability correction, a force feedback signal, and a position feed back signal.

27. The steer-by-wire control system of claim 2 wherein said road wheel system comprises a closed loop control system responsive to at least one of said hand wheel position signal, said vehicle speed signal, said road wheel stability correction, said road wheel position.

28. The steer-by-wire control system of claim 2 wherein said road wheel system comprises a road wheel reference command unit and a road wheel servo control unit.

29. The steer-by-wire control system of claim 28 wherein:
said road wheel reference command unit is responsive to said hand wheel position signal, said vehicle speed signal, and said road wheel stability correction and generates a road wheel reference command signal; and
said road wheel servo control unit is responsive to said road wheel position and said road wheel reference command signal to provide a road wheel command to said road wheel actuator wherein said road wheel actuator is configured to position a road wheel.

30. The steer-by-wire control system of claim 29 wherein said road wheel servo control unit includes a frequency based compensator configured to characterize spectral content of at least one of said road wheel reference command signal and said hand wheel torque signal to maintain stability of said road wheel system.

31. The steer-by-wire control system of claim 29 wherein said road wheel system includes a configurable frequency based filter configured to characterize spectral content of said hand wheel position to constrain bandwidth of hand wheel inputs to said hand wheel system.

32. The steer-by-wire control system of claim 31 wherein said configurable frequency based filter comprises a user configurable filter.

33. The steer-by-wire control system of claim 31 wherein said configurable frequency based filter comprises a second order discrete filter.

34. The steer-by-wire control system of claim 29 wherein said road wheel command is a resultant of a frequency based compensator applied to a road wheel position error signal.

35. The steer-by-wire control system of claim 34 wherein said road wheel position error signal results from a difference of said road wheel reference command signal and said road wheel position.

36. The steer-by-wire control system of claim 35 wherein said road wheel reference command signal results from a summation of a road wheel stability correction and a road wheel reference position signal.

37. The steer-by-wire control system of claim 36 wherein said road wheel reference position signal results from a multiplication of a speed compensated steering ratio and a resultant hand wheel position signal.

38. The steer-by-wire control system of claim 37 wherein said speed compensated steering ratio results from a variable ratio look up table, responsive to said vehicle speed signal and said hand wheel position signal.

39. The steer-by-wire control system of claim 38 wherein said resultant hand wheel position signal results from a configurable frequency based filter responsive to said hand wheel position signal.

40. The steer-by-wire control system of claim 39 wherein said configurable frequency based filter is user configurable.

41. The steer-by-wire control system of claim 37 wherein said variable ratio, look up table is configurable.

42. The steer-by-wire control system of claim 1 wherein said configurable control topology comprises at least one of; a configurable frequency based filter a look up table, which is user configurable.

43. A method of steering a vehicle, the method comprising:
receiving a hand wheel stability correction;
receiving a road wheel stability correction;
receiving a rack force signal responsive to a measured rack force;
receiving a road wheel position signal responsive to a road wheel position;
receiving a hand wheel position signal responsive to a hand wheel position;
receiving a hand wheel torque signal responsive to a hand wheel torque;
receiving a vehicle speed signal responsive to a vehicle speed;
generating a hand wheel actuator command signal;
generating a road wheel actuator command signal;
wherein said hand wheel actuator command signal is the resultant of a configurable control topology; and
wherein said road wheel actuator command signal is the resultant of a configurable control topology.

44. The method of claim 43 wherein said hand wheel actuator command signal is responsive to said hand wheel torque signal, said hand wheel position signal, hand wheel stability command, and said vehicle speed signal.

45. The method of claim 44 wherein said rack force signal and a road wheel position signal are produced in a road wheel system electrically connected to a master control system.

46. The method of claim 45 wherein said road wheel system comprises a closed loop control system responsive to at least one of said hand wheel position signal, said vehicle speed signal, said road wheel stability correction, said road wheel position signal.

47. The method of claim 45 wherein said road wheel system comprises a road wheel reference command unit and a road wheel servo control unit.

48. The method of claim 47 further including:
generating a road wheel reference command signal in said road wheel reference command unit, responsive to said hand wheel position signal said vehicle speed signal, and said road wheel stability correction; and,
providing said a road wheel actuator command signal to said road wheel actuator from said road wheel servo control unit, said road wheel actuator command signal responsive to said road wheel position signal and said road wheel reference command signal, and wherein said road wheel actuator configured to position a road wheel.

49. The method of claim 48 wherein said providing includes characterizing spectral content of at least one of said road wheel reference command signal and said hand wheel torque signal with a frequency based compensator configured to maintain stability of said road wheel system.

50. The method of claim 48 wherein said providing includes characterizing spectral content of said hand wheel position signal with a configurable frequency based filter configured to constrain bandwidth of hand wheel inputs to said road wheel system.

51. The method of claim 50 wherein said configurable frequency based filter comprises a user configurable filter.

52. The method of claim 50 wherein said configurable frequency based filter comprises a second order discrete filter.

53. The method of claim 48 wherein said road wheel actuator command signal is a resultant of a frequency based compensator applied to a road wheel position error signal.

54. The method of claim 53 wherein said road wheel position error signal results from a difference of said road wheel reference command signal and said road wheel position.

55. The method of claim 54 wherein said road wheel reference command results from a summation of a road wheel stability correction and a road wheel position reference position signal.

56. The method of claim 55 wherein said road wheel reference position signal results from a multiplication of a speed compensated steering ratio and a resultant hand wheel position signal.

57. The method of claim 56 wherein said speed compensated steering ratio results from a variable ratio look up table, responsive to said vehicle speed signal and said hand wheel position signal.

58. The method of claim 57 wherein said resultant hand wheel position signal results from a configurable frequency based filter responsive to said hand wheel position signal.

59. The method of claim 58 wherein said configurable frequency based filter is user configurable.

60. The method of claim 56 wherein said variable ratio look up table is configurable.

61. The method of claim 43 wherein said road wheel actuator command signal is responsive to said hand wheel position signal, said road wheel stability command, and said vehicle speed signal.

62. The method of claim 61 wherein said hand wheel position signal and a hand wheel torque signal are produced in a hand wheel system electrically connected to a master control system.

63. The method of claim 62 wherein said hand wheel system comprises a closed loop control system responsive to at least one of said hand wheel torque signal, said rack force signal, said vehicle speed signal, said hand wheel position signal and said hand wheel stability correction.

64. The method of claim 62 wherein said hand wheel system comprises a hand wheel reference command unit and a torque servo control unit.

65. The method of claim 64 further including:
generating a hand wheel reference command signal in said hand wheel reference command unit, responsive to said rack force signal, said vehicle speed signal, said hand wheel position signal and said hand wheel stability correction; and,
providing said hand wheel actuator command signal to said hand wheel actuator from said torque servo control unit, said hand wheel actuator command signal responsive to said hand wheel torque signal and said hand wheel reference command signal, and wherein said hand wheel actuator is configured to position a hand wheel thereby generating a reaction torque.

66. The method of claim 65 wherein said providing includes characterizing spectral content of at least one of said hand wheel reference command signal and said hand wheel torque signal with a frequency based compensator torque servo control system configured to maintain stability of said hand wheel system.

67. The method of claim 65 wherein said providing includes characterizing spectral content of said rack force signal with a configurable frequency based filter configured to increase bandwidth of said hand wheel system.

68. The method of claim 67 wherein said configurable frequency based filter comprises a user configurable filter.

69. The method of claim 67 wherein said configurable frequency based filter comprises a second order discrete filter.

70. The method of claim 65 wherein said providing includes characterizing spectral content of said hand wheel position signal with a configurable frequency based filter configured to control return force dynamic characteristics of said hand wheel system.

71. The method of claim 70 wherein said configurable frequency based filter comprises a user configurable filter.

72. The method of claim 71 wherein said configurable frequency based filter comprises a second order discrete filter.

73. The method of claim 70 wherein said providing includes characterizing spectral content of said rack force signal with another configurable frequency based filter configured to increase bandwidth of said hand wheel system.

74. The method of claim 73 wherein said another configurable frequency based filter comprises a user configurable filter.

75. The method of claim 73 wherein said another configurable frequency based filter comprises a second order discrete filter.

76. The method of claim 73 wherein said hand wheel reference command results from a summation including a hand wheel stability correction, a force feedback signal, and a position feed back signal.

77. The method of claim 76 wherein said force feedback signal results from a torque feed back look up table responsive to said vehicle speed signal and a resultant force signal.

78. The method of claim 76 wherein said force feedback signal results from a torque feed back look up table responsive to said vehicle speed signal and a resultant force signal.

79. The method of claim 78 wherein said torque feed back look up table is user configurable.

80. The method of claim 78 wherein said resultant force signal comprises a resultant from a configurable frequency based filter responsive to said rack force signal.

81. The method of claim 80 wherein said configurable frequency based filter is user configurable.

82. The method of claim 78 wherein said position feed back signal results from a torque return look up table responsive to said vehicle speed signal and a resultant position signal.

83. The method of claim 82 wherein said torque return look up table is user configurable.

84. The method of claim 82 wherein said resultant position signal results from another configurable frequency based filter responsive to said hand wheel position signal.

85. The method of claim 84 wherein said another configurable frequency based filter is user configurable.

86. The method of claim 65 wherein said hand wheel reference command results from a summation including a hand wheel stability correction, a force feedback signal, and a position feed back signal.

87. The method of claim 43 wherein said vehicle speed signal is produced with a vehicle speed sensor electrically connected to a master control system and a hand wheel system.

88. The method of claim 43 wherein said hand wheel stability correction and a road wheel stability correction are calculated in a master control system.

89. The method of claim 43 wherein said configurable control topology comprises at least one of; a configurable frequency based filter, a look up table, which is user configurable.

90. A storage medium encoded with a machine-readable computer program code for steering a vehicle, said storage medium including instructions for causing a computer to implement a method comprising:
    receiving a hand wheel stability correction;
    receiving a road wheel stability correction;
    receiving a rack force signal responsive to a measured rack force;
    receiving a road wheel position signal responsive to a road wheel position;
    receiving a hand wheel position signal responsive to a hand wheel position;
    receiving a hand wheel torque signal responsive to a hand wheel torque;
    receiving a vehicle speed signal responsive to a vehicle speed;
    generating a hand wheel actuator command signal;
    generating a road wheel actuator command signal;
    wherein said hand wheel actuator command signal is the resultant of a configurable control topology; and
    wherein said road wheel actuator command signal is the resultant of a configurable control topology.

91. A computer data signal for steering a vehicle, said computer data signal comprising code configured to cause a computer to implement a method comprising:
    receiving a hand wheel stability correction;
    receiving a road wheel stability correction;
    receiving a rack force signal responsive to a measured rack force;
    receiving a road wheel position signal responsive to a road wheel position;
    receiving a hand wheel position signal responsive to a hand wheel position;
    receiving a hand wheel torque signal responsive to a hand wheel torque;
    receiving a vehicle speed signal responsive to a vehicle speed;
    generating a hand wheel actuator command signal;
    generating a road wheel actuator command signal;
    wherein said hand wheel actuator command signal is the resultant of a configurable control topology; and
    wherein said road wheel actuator command signal is the resultant of a configurable control topology.

92. A steer-by-wire control system, comprising:
    a master control system;
    a road wheel system electrically connected to said master control system including a road wheel position sensor to produce and transmit a road wheel position and a rack force sensor to produce and transmit a rack force signal;
    a hand wheel system electrically connected to said master control system and said road wheel system including a hand wheel position sensor to produce and transmit a hand wheel position signal and a torque sensor to produce and transmit a hand wheel torque signal;
    a vehicle speed sensor for producing a vehicle speed signal, said vehicle speed sensor electrically connected to at least one of; said master control system, said hand wheel system, and said road wheel system;
    a hand wheel actuator configured to receive commands from said hand wheel system;
    a road wheel actuator configured to receive commands from said road wheel system;
    wherein said hand wheel system includes a configurable control topology;
    wherein said road wheel system includes another configurable control topology;
    wherein said configurable control topology and said another configurable control topology are limited and interlocked to ensure configurations that maintain stability of said steer-by-wire control system.

* * * * *